Aug. 1, 1961     H. F. COOPER     2,994,546
ROCKING AXLE AND RESTRAINING DEVICE THEREFOR
Filed Sept. 25, 1958
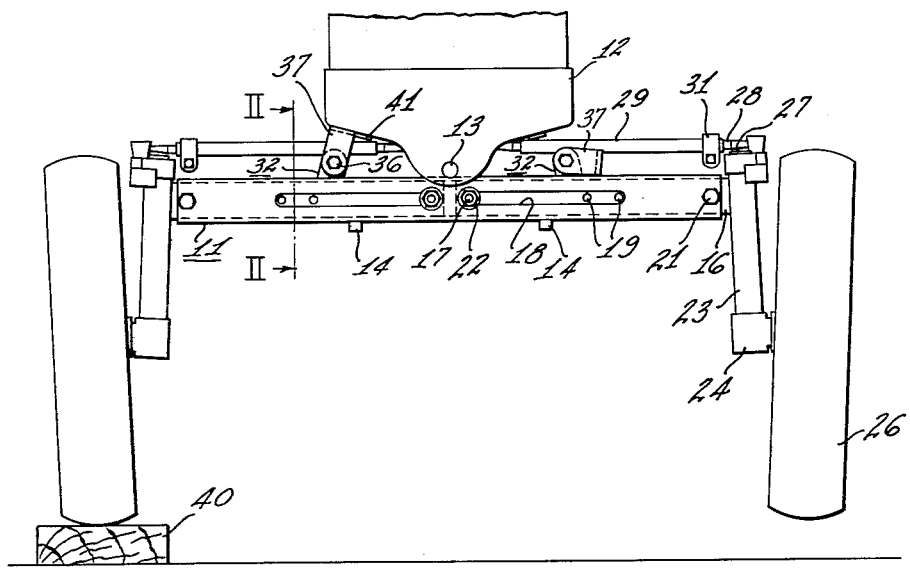
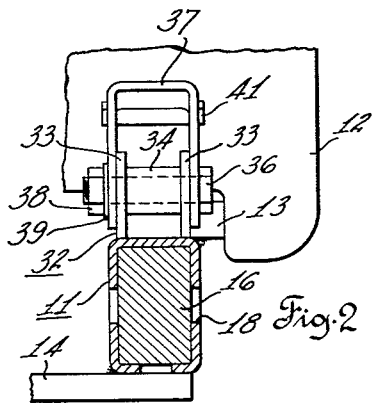
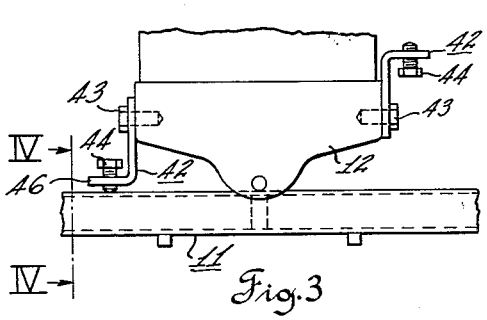
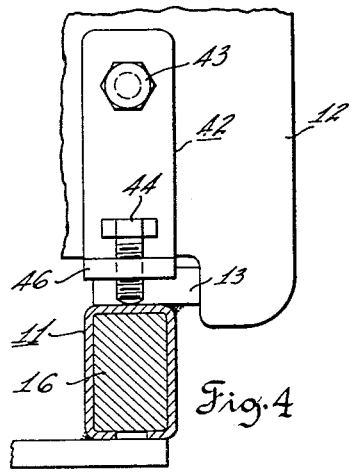
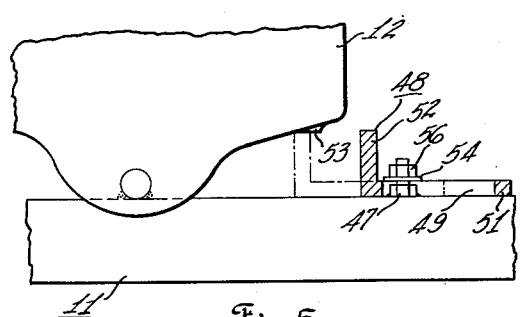
Inventor
Howard F. Cooper
by John P. Hines
Attorney 2,994,546
ROCKING AXLE AND RESTRAINING DEVICE THEREFOR
Howard F. Cooper, Theinsville, Wis., assignor to Allis-Chalmers Manufacturing Company, Milwaukee, Wis.
Filed Sept. 25, 1958, Ser. No. 763,329
3 Claims. (Cl. 280—111)

This invention pertains to vehicles having an axle connected to the front of the vehicle for rocking movement relative thereto and more particularly to a device for selectively restraining this rocking movement.

Because of the variety of uses for the farmer's tractor, in recent years the tractor having two widely spaced dirigible wheels has become more popular than the tricycle type tractor. This tractor having the widely spaced dirigible wheels is referred to as an adjustable front axle tractor and has the axle connected to the front of the tractor in one of two different ways. One method of connection allows the axle to rock in a vertical plane relative to the tractor frame and also to pivot in a horizontal plane relative to the tractor frame in order to supply the necessary steering motion. The more conventional type of adjustable front axle tractor includes a pivot connection between the axle and the tractor frame allowing rocking movement in a vertical plane, however restraining any relative movement in a horizontal plane. The steering motion to the wheels is provided through a conventional tie rod linkage and associated spindle mechanism.

Since the adjustable front axle tractor is to be used for many different farming operations and one of these operations is cultivation, the spacing between the front wheels of the tractor must be varied to allow the tractor to pass over crops spaced different distances apart. This can be accomplished by employing jacks to remove the weight from the front wheels so that the axle can be extended. To jack up the axle of the tractor is somewhat of a precarious operation and it furthermore requires the use of a jacking device which must be carried on the tractor or necessitates the return of the tractor to the barn so that a jack can be used.

It is applicant's intention to provide a device which allows the removal of the weight from one wheel of an adjustable front axle tractor without the necessity of employing a jack. In this manner the adjustable front axle can be extended or contracted without the necessity of overcoming the friction between the steerable wheel and the ground and between the axle section and its housing. Furthermore, when it is necessary to change a tractor wheel this device overcomes the necessity of employing a jack.

It is therefore a general object of the invention to provide a tractor having an adjustable front axle with a device for raising one dirigible wheel from the ground without employing any form of jacking device.

Another object of the invention is to provide a tractor having an adjustable front axle pivotally connected to the tractor frame for rocking movement relative thereto with a device for selectively making the axle rigid with the tractor frame.

A further object of the invention is to provide a tractor of the hereinbefore described type with a device for selectively resisting relative rocking movement between the tractor frame and axle in one direction.

The foregoing and other objects of the invention will become more fully apparent from the following description of the embodiments shown in the accompanying drawings. Referring to the drawings in which like reference characters designate the same or similar parts in the various views:

FIG. 1 is a front elevation of an adjustable front axle pivotally connected to a tractor frame with the inventive device engaged to hold one dirigible wheel out of contact with the ground;

FIG. 2 is a view taken along the line II—II in FIG. 1;

FIG. 3 is a front elevation showing in portion an adjustable front axle connected to a tractor frame with a different embodiment of the inventive device;

FIG. 4 is a view taken along the line IV—IV in FIG. 3; and

FIG. 5 is a front elevation showing in portion an adjustable front axle pivotally connected to a tractor frame with a different embodiment of the inventive device.

Referring now to FIG. 1, the adjustable front axle is composed of an axle housing 11, two axle sections 16 and a spindle housing 23 connected to the remote end of each axle section. The axle housing 11 is shown pivotally connected to a tractor frame 12 through a pivot pin 13. The pin is rigidly connected to the center portion of the axle housing in any conventional manner as by welding and journaled in the tractor frame. Rigidly connected to the under side of the axle housing are two bracing struts 14 which extend rearward and are pivotally connected (not shown) to the tractor frame. The two pivot connections between the axle housing and the tractor frame are axially aligned with one another. These connections between the axle housing and the tractor frame allow the adjustable front axle to rock in a vertical plane relative to the tractor frame but resist rotation of the axle in a horizontal plane relative to the tractor frame.

Since the supporting structure for each dirigible wheel is identical, only one will be described in detail, however, prime numbers will be employed to point out the identical portions for the other dirigible wheel. An axle section 16 is telescopically contained within the axle housing 11 and is selectively rigidly attached thereto by a stud bolt arrangement and a cap screw. The stud 17 is attached to the axle section and extends through a slot 18 in the front face of the axle housing. The axle section 16 has a number of threaded openings 19 therein which are selectively alignable with an opening through the front face of the axle housing spaced from the slot 18. A cap screw 21 is passed through the opening in the axle housing and threaded into an aligned threaded opening 19 in the axle section 16. In this manner, if it is desired to extend the axle section 16 relative to the axle housing 11 it is only necessary to remove the cap screw 21 and loosen a nut 22 on the stud bolt 17. It is then possible to slide the axle section relative to the axle housing to any desired position. When in the desired position, the cap screw 21 is again passed through the opening in the axle housing and threaded into the aligned threaded opening 19. The nut 22 is tightened on the stud bolt 17 and the axle section 16 is again rigid with the axle housing.

Rigidly attached to the remote end of the axle section 16 and depending therefrom is the spindle housing 23. The lower end of this spindle housing is operatively connected through an elbow 24 to a dirigible wheel 26. Operatively contained within the spindle housing is a spindle 27 which is connected to a wheel spindle (not shown) in the elbow 24 so that steering movement can be transmitted to the diribigle wheel 26. Connected for steering movement to the spindle 27 is a conventional tie rod structure. This tie rod structure is composed of two telescoping links 28 and 29. A clamp 31 allows the links to telescope relative to one another so that they can be extended or contracted to conform to the extended or contracted position of the axle section 16 relative to the axle housing 11. The link 29 is operatively connected to a lever (not shown) which is operated by the tractor steering wheel to provide steering motion to the spindle 27.

As shown in FIGS. 1 and 2, one embodiment of my invention is composed of an upstanding U-shaped support 32 having the base rigidly connected in any conventional manner to the top of the axle housing 11 in close proximity to the tractor frame 12. The support 32 is composed of two spaced upstanding legs 33 having a bushing 34 rigidly connected between opposing faces of the two legs. The bushing combines with holes in each of the legs to provide a journal for a cap screw 36. A force transmitting element 37 having an inverted U-shaped configuration is pivotally connected to the support 32. The cap screw 36 passes through openings in the legs of the inverted U-shaped element 37 which align with the openings in the upstanding legs of the support 32. A self-locking nut 38 is threaded onto the cap screw 36 against a thrust washer 39. The self-locking nut is threaded on in such a manner as to allow relative pivotal movement of the force transmitting element 37 relative to the support 32.

In order to explain my invention, let it be assumed that it is desired to remove the right dirigible wheel (as viewed in FIG. 1) from the ground. The left hand axle restraining device is engaged with the tractor frame by pivoting the force transmitting element 37 upward until it strikes a stop 41 formed on the tractor frame 12. This stop is to insure retention of the element 37 in its operative position until there is a pressure contact between the element and the tractor frame. The right hand axle restraining device is in an inoperative position wherein the force transmitting element is out of engagement with the tractor frame. With the left hand element 37 contacting the frame 12 the tractor is driven so that the left dirigible wheel moves onto high ground or any object such as a block 40. Upon moving onto the block the adjustable front axle tends to pivot in a clockwise direction relative to the tractor frame. However, because of the contact between the element 37 and the tractor frame the force tending to pivot the axle is directed into the tractor frame and the axle does not pivot relative to the frame. The two rear wheels and the left front dirigible wheel provide a tripod which supports the tractor. Inasmuch as the majority of the tractor weight is centered closer to the rear of the tractor than the front of the tractor the center of mass is positioned directly above the plane defined by the left front wheel and the two rear wheels and the tractor is in static equilibrium. That is, the tractor will not tip forward and the right front wheel is held from the ground. In this raised position, it is a simple matter to change the wheel or adjust the axle. The same procedure is followed only in a reverse manner when it is found necessary to remove the weight from the left front dirigible wheel of the tractor.

As is shown in FIGS. 3 and 4, another embodiment of my invention is composed of an L-shaped force transmitting element 42 pivotally supported on a cap screw 43 which is threaded into the tractor frame. If it is desired to keep the right hand dirigible wheel out of contact with the ground, the left hand L-shaped element 42 is pivoted downward as is shown in FIG. 3 until a leg 46 is parallel to and adjacent the axle housing 11. A screw 44 is turned through a threaded opening in the leg 46 of the L-shaped element until the screw 44 firmly abuts against the axle housing. The procedure mentioned above in regard to FIG. 1 is again carried out and the right front dirigible wheel can be held out of contact with the ground. When the L-shaped element is not in use it is only necessary to release the cap screw 43 and pivot the L-shaped element to the inverted position shown in FIG. 3 and retighten the cap screw to retain the element in this position. It should be pointed out that if the L-shaped element 42 and the cap screws 43 and 44 are of sufficient size, it is possible to remove a portion of the weight from one of the dirigible wheels without the necessity of driving the opposite dirigible wheel onto a block. This can be accomplished by merely turning the cap screw 44 into engagement with the axle housing 11 until the left front dirigible wheel is compressed thereby removing a portion of the weight from the right front dirigible wheel and transferring it to the left front dirigible wheel.

A further embodiment of my invention and somewhat simpler in construction is shown in FIG. 5. This embodiment consists of a cap screw 47 having its head portion rigidly attached in any conventional manner such as by welding to the top of the axle housing 11 so that the threaded portion of the cap screw extends upward from the axle housing. An angled force transmitting element 48 has a groove 49 cut in its longer leg 51 which fits over the head of the cap screw 47. In this manner, the angled element is free to slide to the left or the right so that a shorter leg 52 may be brought into engagement with a pad 53 on the tractor frame. A washer 54 and nut 56 threaded on the cap screw 47 can be tightened to hold the angled element in an operative or inoperative position. The procedure used with this embodiment of the invention for raising a dirigible wheel of a tractor from the ground is identical to that described for the first embodiments of the invention.

With this axle restraining device applicant has developed an incomplex and inexpensive device for raising a dirigible wheel of a tractor having a wide front axle pivotally connected to the tractor for rocking movement in a vertical plane. With this device it is no longer necessary to employ a jack or a hoist to change a tire or adjust the dirigible wheel spacing.

It should be understood that although three specific embodiments of the invention have been shown and described there are many different ways of selectively making the adjustable front axle rigid with the tractor frame and it is not intended that the three embodiments herein described with reference to the drawings should limit the scope of the invention as defined by the appended claims.

What is claimed is:

1. The combination comprising: a land vehicle having a longitudinally disposed frame member; a rigid transversely disposed extensible and contractible axle member connected intermediate its ends to said frame member for rocking movement in a vertical plane; a ground engaging wheel connected to each end of said axle member, said wheels each supporting a portion of the front end weight of the vehicle; a support rigidly connected to one of said members adjacent the other of said members; and a force transmitting element pivotally connected to said support for selective movement from an inoperative position to an operative position of engagement with said other of said members to hold said axle against said rocking movement relative to said frame in one direction to permit one of said wheels to be held above the ground when the other of said wheels supports the full front end weight of the vehicle.

2. The combination comprising: a land vehicle having a longitudinally disposed frame member; a rigid transversely disposed extensible and contractible axle member connected intermediate its ends to said frame member for rocking movement in a vertical plane; a ground engaging wheel connected to each end of said axle member, said wheels each supporting a portion of the front end weight of the vehicle; a support rigidly connected to said axle member adjacent said frame member; and a force transmitting element pivotally connected to said support for selective movement from an inoperative position to an operative position of engagement with said frame member to hold said axle against said rocking movement relative to said frame in one direction to permit one of said wheels to be held above the ground when the other of said wheels supports the full front end weight of the vehicle.

3. The structure defined by claim 2, and further comprising a stop formed on said frame member in abutting relation to said force transmitting element when the latter is moved to its operative position.

References Cited in the file of this patent

UNITED STATES PATENTS

| | | |
|---|---|---|
| 987,660 | Wood | Mar. 21, 1911 |
| 1,120,036 | Dearing | Dec. 8, 1914 |
| 1,153,112 | Johnson | Sept. 7, 1915 |
| 1,975,119 | Oates | Oct. 2, 1934 |
| 2,604,332 | Kent | July 22, 1952 |
| 2,675,247 | Meng | Apr. 13, 1954 |
| 2,750,199 | Hart | June 12, 1956 |